US006749862B2

(12) United States Patent
Landers

(10) Patent No.: US 6,749,862 B2
(45) Date of Patent: Jun. 15, 2004

(54) METHOD AND COMPOSITION OF DISRUPTING FEEDING PATTERNS OF WOODPECKERS

(76) Inventor: Phillip G. Landers, 5312 Vista Club Run, Sanford, FL (US) 32771

( * ) Notice: Subject to any disclaimer, the term of this patent is extended or adjusted under 35 U.S.C. 154(b) by 9 days.

(21) Appl. No.: 10/212,426

(22) Filed: Aug. 5, 2002

(65) Prior Publication Data

US 2003/0026909 A1 Feb. 6, 2003

Related U.S. Application Data

(60) Provisional application No. 60/310,286, filed on Aug. 6, 2001.

(51) Int. Cl.[7] ............................................. A01N 25/10
(52) U.S. Cl. ....................... 424/409; 427/189; 514/675; 514/920
(58) Field of Search .................... 52/741.3; 424/409, 424/411; 427/189; 514/675, 920

(56) References Cited

U.S. PATENT DOCUMENTS 4,051,279 A * 9/1977 Peterson ..................... 427/355
4,414,227 A * 11/1983 Tomlinson .................. 424/331
4,773,792 A    9/1988 Landers
4,905,441 A    3/1990 Landers
5,245,812 A    9/1993 Landers
6,237,305 B1   5/2001 Landers

* cited by examiner

Primary Examiner—Philip Tucker
Assistant Examiner—D. Aylward
(74) Attorney, Agent, or Firm—William M. Hobby, III

(57) ABSTRACT

A method and composition for deterring wood damage, such as caused by woodpeckers. The method includes blending Isophorone with an epoxy resin and acrylic based sealant to form a resin composition and mixing the resin composition with a solvent resistant epoxy hardener to form a coating material. The coating material is then used to coat a wood surface to seal and coat the wood for deterring woodpecker damage to the wood. The composition may include clay and flocculated silica thickeners therein. The coating composition includes Isophorone blended with an epoxy resin and micro-capsules of acrylic and is mixed with a solvent resistant epoxy hardener. The Isophorone will not blend with the epoxy compound but blends with the acrylic resin and disperses throughout the coating composition. The solvent resistant epoxy hardener is used in connection with the epoxy compound, acrylic resin and solvent Isophorone.

11 Claims, No Drawings

METHOD AND COMPOSITION OF DISRUPTING FEEDING PATTERNS OF WOODPECKERS

This application benefit of Ser. No. 60/310,286 Aug. 6, 2001.

BACKGROUND OF THE INVENTION

All growing trees contain living organisms that, given the proper environment of food, moisture, and oxygen, can produce decay in wood. One mechanism that keeps these decay organisms in check is the lack of oxygen inside the wood that prevents these organisms from flourishing.

Trees used for utility poles undergo a specified manufacturing and treatment process prior to their final in-service utility application. This manufacturing/treatment process, generally described, includes cutting of the tree, removal of the bark, drying the wood pole, and treating the wood pole with preservatives under specified pressure and temperature. Penetration of the preservatives is limited to approximately 2" to 3" of the outside shell of the pole. Therefore, only decay organisms present in the outside shell are destroyed. Decay organisms further inside the wood, away from the preservative treated zone, remain alive. Without available oxygen, they remain dormant. With moisture and food sources available inside the untreated portions of the pole, the availability of oxygen to these decay organisms will result in the initiation of the woodpecker's food chain, which results from wood decay which causes insect infestation and woodpecker damage.

Various mechanisms can lead to a breach in the preservative layer of a treated wood pole. These include, but are not limited to, weather checks and cracks caused by environmental conditions, such as wet-dry and freeze-thaw cycles, and woodpeckers foraging for food. Whatever the cause of the treatment breach, if oxygen becomes available to existing decay organisms, they can flourish.

As discussed in my U.S. Pat. No. 6,237,305, Process for In-Situ Treatment of Wood Poles, Isophorone (3,5,5-trimethyl-2-cyclohexen-one-1) has been found to be a highly effective water-misable, low volatility solvent that migrates easily through an aqueous medium. Isophorone has also been found to effectively liquefy certain types of wood preservatives, especially creosote and pentachlorophenol, both of which are oil-dispersed treatments. I have conducted tests, disclosed in my U.S. Pat. No. 6,237,305, in which an Isophorone-acrylic resin solution was painted on groundline sections of treated wood poles. Substantial penetration of this solution was observed to migrate both along and across the wood's grain. The extent of migration was observed to vary with the type of preservative and moisture content in the wood. I have also conducted tests in which an Isophorone-epoxy resin sealant solution was painted on sections of treated wood poles. Similarly, substantial penetration of this sealant solution was observed to migrate both along and across the wood's grain effectively sealing the wood against oxygen penetration.

The present invention deals with an Isophorone formulated epoxy/Isophorone and micro-capsules of acrylic resin wood sealant to deter woodpecker activity from a treated wood utility pole. The micro-capsules of acrylic resin sealant is employed to time-release sealant into the wood. Tests have shown that these compositions when applied in accordance with the present process effectively interrupts the decay and resulting insect infestation and resulting woodpecker damage food chain and reduces further woodpecker activity.

SUMMARY OF THE INVENTION

A method and composition for deterring wood damage, such as caused by woodpeckers. The method includes blending Isophorone with an epoxy resin and acrylic based sealant to form a resin composition and mixing the resin composition with a solvent resistant epoxy hardener to form a coating material. The coating material is then used to coat a wood surface to seal and coat the wood for deterring woodpecker damage to the wood. The composition may include clay and flocculated silica thickeners therein. The coating composition includes Isophorone blended with an epoxy resin and micro-capsules of acrylic and is mixed with a solvent resistant epoxy hardener. The Isophorone will not blend with the epoxy compound but blends with the acrylic resin and disperses throughout the coating composition. The solvent resistant epoxy hardener is used in connection with the epoxy compound, acrylic resin and solvent Isophorone.

DESCRIPTION OF THE PREFERRED EMBODIMENT

A method and coating composition of deterring woodpeckers from treated wood poles by depleting oxygen required for decay organisms, thereby breaking the decay and resulting insect infestation and woodpecker food chain. An epoxy resin-based wood pole sealant comprised of high strength epoxy and Isophorone, and containing micro-capsules of acrylic-based sealant, is painted onto the pole, including those areas which have experienced surface breaches in the pole's outside treated shell. Once cured, the epoxy and acrylic sealants prevent oxygen from reaching the decay organisms, thus disrupting the woodpecker's food chain in these poles. Micro-capsules of an acrylic resin-based sealant, such as described in my U.S. Pat. No. 6,237,305, are incorporated into the epoxy-based sealant to provide an additional time-released sealant into the treated wood pole.

The preferred resin composition includes by weight 30–40% Bisphenol A Diglycidal Ether Polymer (Epoxy Resin); 5–15% Isophorone (3,5,5-trimethyl-2-cyclohexen-one-1); 4–8% of a clay thickener and 1–2% of a flocculated silica thickener; 1–2% of various color pigments; and 8–20% micro-capsules of acrylic resin-based sealant. This resin composition is blended together in any order to form the resin for use with the hardener composition. The preferred hardener composition is 25–35% polyamide resin which is solvent resistant to the Isophorone.

The combining of the resin and the hardener composition provides a non-foaming coating which can be painted on with a paint brush or the like. Cure time can be varied from a few minutes to several hours. It has a long cure time of six hours. A very thin coat may be applied for obtaining the desired results. Once a resin is mixed with the hardener composition, it is painted onto the surface of a utility pole covering the surface of the pole where it deters woodpeckers with the Isophorone formulated epoxy compound with micro-capsules of acrylic resin wood sealant. The micro-capsules of acrylic resin sealant aids in the time release of the sealant into the wood to interrupt decay in the wood and thereby block insect infestation to reduce woodpecker activity while the Isophorone also acts as a deterrent to the woodpecker activity. The Isophorone does not mix with epoxy but is dispersed in the acrylic which is then spread throughout the coating.

EXAMPLE

A specific formula includes by weight 39% Bisphenol A Diglycidal Ether Polymer, 10% Isophorone, 4% of a clay thickener, 2% flocculated silica thickener, 2% of various color pigments, 15% micro-capsules of acrylic resin-based sealant, and 28% polyamide resin. The Isophorone is obtained from Union Carbide while the Bisphenol A Diglycidal Ether Polymer is obtained from Shell Chemical under their formula Epon 828. The clay thickener is Claytone APA from Southern Clay Products and the flocculated silica thickener is Degusa Aerosil 200. Micro-capsules of acrylic resin-based sealant consists of acrylic resin-based sealant, described in my U.S. Pat. No. 6,237,305, Process for In-Situ Treatment of Wood Poles, blended under vacuum with an equal amount of porous ceramic pellets. The porous ceramic pellets are Veri-lite obtained from Harbinson-Walker Refractories Company. The polyamide resin is obtained from Cognis Corporation under their formula Versamid 125LV.

What is claimed is:

1. A method of deterring wood damage comprising the steps of:
   blending Isophorone, with an epoxy resin and an acrylic based sealant to form a resin composition;
   mixing said resin composition with an epoxy hardener composition to form a coating material; and
   coating said coating material onto a wood surface to seal and coat said wood thereby deterring woodpecker damage to said wood.

2. The method of deterring wood damage in accordance with claim 1 in which the step of mixing an epoxy hardener includes mixing a solvent resistant epoxy hardener.

3. The method of deterring wood damage in accordance with claim 1 in which the step of mixing an epoxy hardener includes mixing a solvent resistant polyamide resin hardener.

4. The method of deterring wood damage in accordance with claim 1 in which the step of blending Isophorone, with an epoxy resin includes blending a clay thickener therein to form said resin composition.

5. The method of deterring wood damage in accordance with claim 4 in which the step of blending Isophorone, and an epoxy resin includes blending a flocculated silica thickener therein to form said resin composition.

6. The method of deterring wood damage in accordance with claim 1 in which the step of coating includes coating a wood utility pole.

7. The method of deterring wood damage in accordance with claim 1 in which the step of blending includes blending by weight 5–15% Isophorone, with 30–40% epoxy resin and 8–20% acrylic based sealant to form a resin composition.

8. The method of deterring wood damage in accordance with claim 7 in which the step of mixing includes mixing by weight said resin composition with 25–35% solvent resistant epoxy hardener composition to form a coating material.

9. A method of deterring wood damage comprising the steps of:
   blending by weight 5–15% Isophorone, with 30–40% epoxy resin and 8–20% acrylic based sealant to form a resin composition;
   mixing by weight said resin composition with 25–35% solvent resistant epoxy hardener composition to form a coating material; and
   coating said coating material onto a wood surface to seal and coat said wood thereby deterring woodpecker damage to said wood.

10. A wood coating composition for deterring woodpecker damage having by weight:
    5–15% Isophorone;
    30–40% epoxy resin;
    8–20% acrylic resin; and
    25–35% epoxy hardener.

11. The wood coating composition for deterring woodpecker damage in accordance with claim 7 further including by weight:
    4–8% clay thickener; and
    1–2% flocculated silica thickener.

* * * * *